United States Patent
Büttner et al.

(10) Patent No.: US 12,224,626 B2
(45) Date of Patent: Feb. 11, 2025

(54) ROTOR OF A DYNAMO-ELECTRIC ROTARY MACHINE, DYNAMO-ELECTRIC MACHINE HAVING A ROTOR, AND METHOD FOR PRODUCING THE ROTOR

(71) Applicants: Innomotics GmbH, Nuremberg (DE); Valeo eAutomotive Germany GmbH, Erlangen (DE)

(72) Inventors: Mario Büttner, Bayern (DE); Klaus Büttner, Hollstadt (DE); Klaus Kirchner, Ostheim (DE); Matthias Warmuth, Windshausen (DE)

(73) Assignee: Innomotics GmbH, Nuremberg (DE)

( * ) Notice: Subject to any disclaimer, the term of this patent is extended or adjusted under 35 U.S.C. 154(b) by 215 days.

(21) Appl. No.: 17/912,389

(22) PCT Filed: Feb. 17, 2021

(86) PCT No.: PCT/EP2021/053883
§ 371 (c)(1),
(2) Date: Sep. 16, 2022

(87) PCT Pub. No.: WO2021/185522
PCT Pub. Date: Sep. 23, 2021

(65) Prior Publication Data
US 2023/0142750 A1  May 11, 2023

(30) Foreign Application Priority Data
Mar. 18, 2020  (EP) ..................................... 20163908

(51) Int. Cl.
*H02K 1/28* (2006.01)
*H02K 7/04* (2006.01)
(Continued)

(52) U.S. Cl.
CPC ................. *H02K 1/28* (2013.01); *H02K 7/04* (2013.01); *H02K 15/0012* (2013.01); *H02K 15/165* (2013.01); *H02K 17/20* (2013.01)

(58) Field of Classification Search
CPC ........... H02K 17/20; H02K 7/04; H02K 1/28; H02K 15/0012; H02K 15/165; H02K 17/165
See application file for complete search history.

(56) References Cited

U.S. PATENT DOCUMENTS 6,147,423 A * 11/2000 Byrd ........................ H02K 7/04
310/124
2008/0150400 A1 * 6/2008 Crowell ................. H02K 17/20
310/201

(Continued)

FOREIGN PATENT DOCUMENTS

| EP | 2 849 320 A2 | 3/2015 |
| JP | 1974042404 U | 4/1974 |

(Continued)

OTHER PUBLICATIONS

WO-2014124762-A2 machine translation Jun. 15, 24.*

(Continued)

*Primary Examiner* — Leda T Pham
(74) *Attorney, Agent, or Firm* — Henry M. Feiereisen LLC

(57) ABSTRACT

A rotor of a dynamo-electric rotary machine includes a rotor core arranged concentrically to a rotor axis and including slots filled with electrically conductive material. A front ring is arranged at a front axial end of the slots and includes electrically conductive material, and a rear ring is arranged at a rear axial end of the slots and includes electrically conductive material. A rotor-core-distal surface of the front ring and/or rear ring has a bevel in axial direction from an outer circumference to an inner circumference, with the bevel defined by a bevel angle having a value of 3° to 30°.

(Continued)

A support element is at least partially connected to the front and/or rear ring with a positive fit and pressed thereon axially, with the support element being supported on a shaft and having a radial end which terminates at a radial end of the front and/or rear ring.

19 Claims, 4 Drawing Sheets

(51) Int. Cl.
*H02K 15/00* (2006.01)
*H02K 17/20* (2006.01)

(56) References Cited

U.S. PATENT DOCUMENTS

| | | | |
|---|---|---|---|
| 2008/0185934 A1 | 8/2008 | Verhoeven | |
| 2013/0207505 A1* | 8/2013 | Kajiya | H02K 17/20 |
| | | | 310/211 |
| 2015/0188397 A1* | 7/2015 | Kim | H02K 15/0012 |
| | | | 29/598 |
| 2019/0393747 A1* | 12/2019 | Tang | H02K 5/20 |

FOREIGN PATENT DOCUMENTS

| | | |
|---|---|---|
| JP | 84942404 U | 7/1974 |
| JP | H02273059 A | 11/1990 |
| WO | WO 2007/000413 A1 | 1/2007 |
| WO | WO-2014124762 A2 * 8/2014 ......... H02K 15/0012 |

OTHER PUBLICATIONS

PCT International Search Report and Written Opinion of International Searching Authority mailed May 7, 2021 corresponding to PCT International Application No. PCT/EP2021/053883 filed Feb. 17, 2021.

* cited by examiner

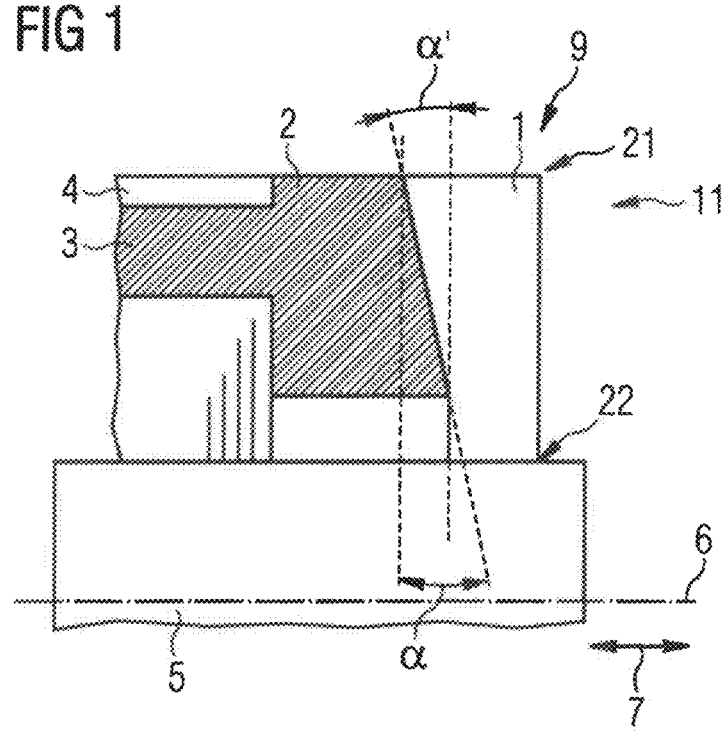
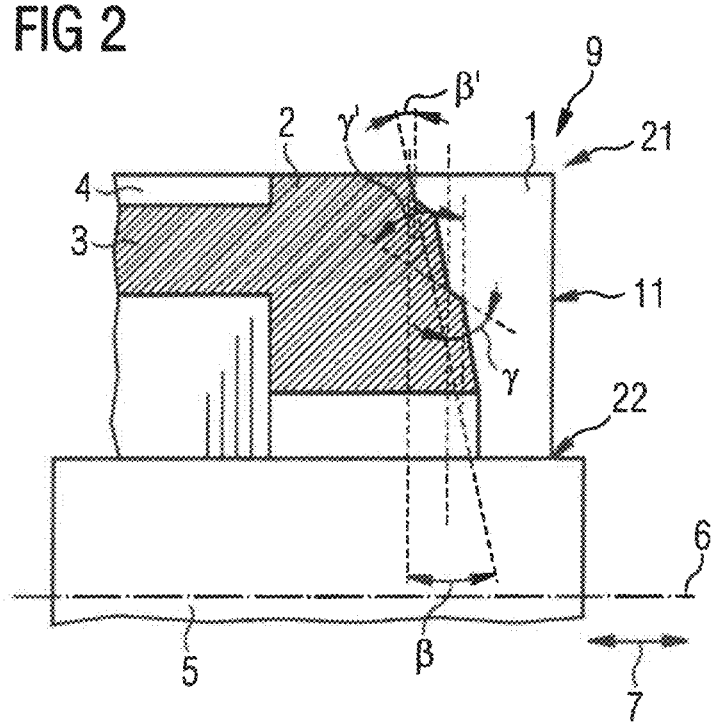

ROTOR OF A DYNAMO-ELECTRIC ROTARY MACHINE, DYNAMO-ELECTRIC MACHINE HAVING A ROTOR, AND METHOD FOR PRODUCING THE ROTOR

CROSS-REFERENCES TO RELATED APPLICATIONS

This application is the U.S. National Stage of International Application No. PCT/EP2021/053883, filed Feb. 17, 2021, which designated the United States and has been published as International Publication No. WO 2021/185522 A1 and which claims the priority of European Patent Application, Ser. No. 20/163,908.5, filed Mar. 18, 2020, pursuant to 35 U.S.C. 119 (a)-(d).

BACKGROUND OF THE INVENTION

The invention relates to a rotor of a dynamo-electric rotary machine, a dynamo-electric machine having a rotor, and a method for producing the rotor.

Rotors of asynchronous machines are often embodied as squirrel-cage rotors. The rotor in this type of configuration has a cage comprising cage bars and a short-circuiting ring in each case at the respective axial ends of the short-circuiting bars. Due to its low material strength, however, the short-circuiting ring deforms at high rotational speeds.

DE 10 2013 218 473 A1 describes a method for producing a squirrel-cage rotor of an asynchronous machine comprising: providing a laminated core having a plurality of openings for receiving bars of a rotor cage; positioning a mold part for a short-circuiting ring at an end face of the laminated core; and casting the bars and the short-circuiting ring. The mold part is cast onto the laminated core in this case, and remains there for the purpose of stabilizing the short-circuiting ring on the squirrel-cage rotor.

It is however disadvantageous in this case that a supporting function of the cast-in mold part is no longer provided after cooling. Due to the shrinkage of the material for the short-circuiting ring during cooling, a hollow space is produced between short-circuiting ring and mold part. During operation, this results in a deformation of the short-circuiting ring due to the centrifugal forces.

An object of the invention can therefore be considered to be improving a stabilization of the short-circuiting ring.

SUMMARY OF THE INVENTION

The object is achieved by a rotor of a dynamo-electric rotary machine, having
- a rotor core arranged concentrically relative to the rotor axis, wherein the rotor core has slots, wherein the slots are filled with at least one electrically conductive material,
- a front ring arranged concentrically relative to the rotor axis at the front axial end of the slots, wherein the front ring comprises at least one electrically conductive material,
- a rear ring arranged concentrically relative to the rotor axis at the rear axial end of the slots, wherein the rear ring comprises at least one electrically conductive material, wherein a surface of the front and/or rear ring facing away from the rotor core at least partially has a bevel in an axial direction from an outer circumference to an inner circumference of the ring, with a bevel angle, at least one support element, wherein the support element is designed in such a way that the support element at least partially is connected to the ring with a positive fit.

The object is further achieved by a dynamo-electric rotary machine, in particular an asynchronous machine, having such a rotor.

The rotor core is preferably a structure having material layers, said material layers being riveted, welded, batch-stamped, adhesively bonded and/or baked together.

The material layers are advantageously laminations. However, other types of material layers are also conceivable.

The rotor core is advantageously a laminated core.

The slots are preferably closed. However, half-open and open slots are also possible.

The filled slots represent short-circuiting bars of the cage winding. The ring represents a short-circuiting ring of the cage winding.

The slots are preferably filled with the electrically conductive material by means of die casting. The front and/or the rear ring are preferably formed by means of die casting using the electrically conductive material.

Alternatively, the slots are filled with the electrically conductive material by means of 3D printing. Alternatively, the front and/or the rear ring are formed by means of 3D printing using the electrically conductive material. Other methods are however also conceivable.

Alternatively, it is also possible for extruded bars, for example copper bars, to be inserted into the slots and for the respective ring to be formed by means of die casting or 3D printing, for example.

The ring is advantageously connected to the filled slots with a material fit.

The electrically conductive material is preferably copper or aluminum. This is advantageous because greater efficiency can be achieved thereby. However, a copper alloy or an aluminum alloy is also possible.

Aluminum advantageously has a temperature-dependent tensile strength of 20 to 60 N/mm$^2$.

It is conceivable for the ring and/or the slots to comprise shaped inserts. These shaped inserts can comprise an electrically non-conductive material.

With regard to the end face, the ring can have more than one bevel angle in the rotary sense.

The ring advantageously fits closely against the rotor core without any clearance. In other words, the ring advantageously fits closely against the last material layer, preferably the last lamination, or against an end ring which enables stacking of the material layers.

In an advantageous embodiment, the support element has, at a surface facing toward the ring, at least one section which has a bevel in an axial direction from the outer circumference to the inner circumference, with a bevel alternate angle which is an alternate angle to the bevel angle.

Ring and support element can therefore be effectively connected with a positive fit.

The slots can be skewed or non-skewed.

In an advantageous embodiment, the bevel angle has a value of 3° to 30°.

This value is advantageous because optimal stabilization of the short-circuiting ring can be achieved thereby.

The material which is present in the ring and/or the slots preferably has greater electrical conductivity than the material which is present in the support element.

The material which is present in the support element preferably has greater mechanical tensile strength than the material which is present in the ring and/or the slots.

In an advantageous embodiment, the support element comprises a material having a tensile strength of 800 N/mm² to 1200 N/mm², in particular 1000 N/mm².

The described tensile strength allows the rotors to be used in the high-speed range, for example in the range of 1500 to 3000 rotations per minute (RPM) in the case of an external rotor diameter of 100 to 200 mm.

In an advantageous embodiment, the support element comprises steel. For example, a quenched and tempered steel containing chromium and/or nickel and/or molybdenum is suitable for this purpose. A case-hardened steel containing chromium and/or nickel and/or molybdenum is also suitable.

The support element can also comprise titanium.

Steel is particularly suitable due to its high strength, good hardenability, stiffness and elongation at rupture. Moreover, steel is affordable and can be formed hot or cold.

In an advantageous embodiment, the surface of the front and/or rear ring facing away from the rotor core has at least one first region having a first part-bevel in an axial direction from an outer circumference to an inner circumference of the ring, with a first part-bevel angle, and at least one second region having a second part-bevel in an axial direction from an outer circumference to an inner circumference of the ring, with a second part-bevel angle, wherein the first part-bevel angle and the second part-bevel angle differ.

In an advantageous embodiment, the support element has, at the surface facing toward the ring, at least one first region having a bevel in an axial direction from the outer circumference to the inner circumference, with a part-bevel alternate angle which is an alternate angle to the first part-bevel angle, wherein the support element has, at the surface facing toward the ring, at least one second region having a bevel in an axial direction from the outer circumference to the inner circumference, with a part-bevel alternate angle which is an alternate angle to the second part-bevel angle.

Provision is preferably made for the engagement of at least those regions of the ring and support element which are subjected to a centrifugal force during operation.

This embodiment allows greater absorption of a radial force component.

In an advantageous embodiment, the support element can be connected to a shaft by means of an interference fit.

This is advantageous because the support element can then simultaneously serve as a balancing element.

Alternatively, the support element can also be connected to the shaft by means of a reinforcing ring. For example, the reinforcing ring here can be connected to the shaft by means of for example an interference fit and the support element clamped between ring and reinforcing ring. Other embodiments are also conceivable.

In an advantageous embodiment, the support element has at least one recess and/or at least one thickening in order to correct an imbalance in particular.

A recess is for example a drilled hole while a thickening is for example a material coating at specific locations.

A recess, obtained by negative weighting, is also referred to as boring out. It is particularly advantageous since this type of rotor balancing can be effected automatically by calculating an imbalance and implementing a corresponding drilled hole with diameter and drilled depth.

The thickening is achieved for example by means of a welding method, for example friction welding of preprepared cylinders. In this case, the support element and for example a preprepared cylinder are preferably moved relative to each other under pressure, said support element and cylinder touching at the contact surfaces. The resulting friction causes the material to heat up and plasticize.

The recess can also be a channel for rear ventilation of the rotor.

The object described above is also achieved by a method for producing such a rotor having a rotor core that is arranged concentrically relative to the rotor axis, said rotor core having slots, for a dynamo-electric rotary machine, comprising the following steps:
providing the rotor core,
filling the slots with at least one electrically conductive material,
depositing at least one electrically conductive material at the front and/or rear axial end of the slots in order to form a front and/or rear ring by means of a shaping device, wherein the shaping device is embodied in such a way that a surface of the front and/or rear ring facing away from the rotor core is at least partially given a bevel in an axial direction from an outer circumference to an inner circumference of the ring, with a bevel angle,
pressing a support element on.

The filling of the slots is advantageously achieved by inserting preprepared bars, in particular copper bars, or by means of die casting, for example aluminum die casting, or a combination thereof. It is also conceivable to introduce other types of shaped insert. The filling of the slots can also be achieved by means of 3D printing.

The formation of the ring is advantageously achieved by means of die casting, for example aluminum die casting. It is also conceivable to introduce shaped inserts made from for example aluminum or another material. The formation of the ring can also be achieved by means of 3D printing.

In an advantageous embodiment, the support element is shrunk onto a shaft.

In an advantageous embodiment, the support element is heated up to a temperature of 100° C. to 140° C., preferably 120° C., for the purpose of shrinking on.

In an advantageous embodiment, the support element is pressed onto the ring in an axial direction.

In an advantageous embodiment, the support element is pressed on with a bonding force of 20 to 40 t, preferably 30 t.

The invention is particularly suitable for asynchronous machines with squirrel-cage rotors. Such dynamo-electric rotary machines are used in various fields, for example for ventilators, pumps, compressors, machine tools and for drives in electric vehicles and hybrid vehicles. The invention is also highly suitable for motors in high-power blowers.

The invention is particularly suitable for dynamo-electric rotary machines in the high-speed range.

The invention is suitable for pure asynchronous machines but is also suitable for other dynamo-electric rotary machines, for example for hybrid machines such as an asynchronous machine with permanent magnets, for example.

The asynchronous machine with permanent magnets runs up to a high rotational speed asynchronously and then switches to synchronous operation. This is advantageous because high levels of efficiency and power can be achieved thereby.

The invention offers the advantage that the rotors can be operated at circumferential speeds exceeding 90 m/s without any risk of deformation of the short-circuiting rings.

Even a circumferential speed of 150 m/s is possible. Such a circumferential speed at the outer circumference of the rotor is required in particular in the field of industrial engineering and technology and for drives in the field of electromobility.

BRIEF DESCRIPTION OF THE DRAWING

The invention is described and explained in greater detail below with reference to the exemplary embodiments illustrated in the figures, in which:

FIG. 1 shows a first embodiment of a rotor according to the invention,

FIG. 2 shows a second embodiment of the rotor,

FIG. 1 shows a first embodiment of a rotor 11 according to the invention.

DETAILED DESCRIPTION OF PREFERRED EMBODIMENTS

Figure 3:
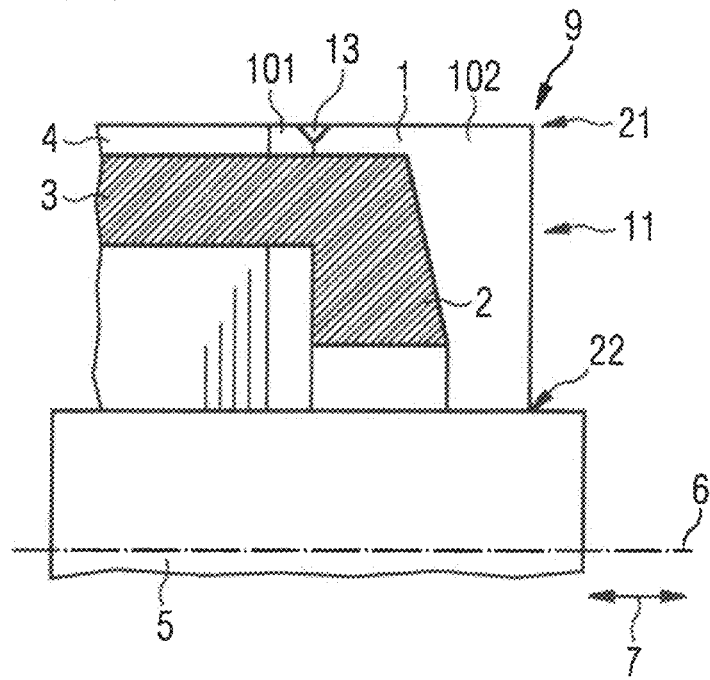
FIG. 3 shows a third embodiment of the rotor.

FIG. 1 shows a rotor core 4 which is arranged concentrically relative to the rotor axis 6, wherein the rotor core 4 has slots 3, said slots 3 being filled with an electrically conductive material. FIG. 1 shows a short-circuiting ring 2 which is arranged concentrically relative to the rotor axis 6 at a rear axial end 9 of the slots 3 and comprises an electrically conductive material.

In the figure, a surface of the ring 2 facing away from the rotor core 3 has a bevel in an axial direction 7 from an outer circumference 21 to an inner circumference 22 of the ring 2, with a bevel angle α.

The figure shows a support element 1 which is at least partially connected to the ring 2. In the figure, the rotor core 4 and the support element 1 adjoin a shaft 5.

At a surface facing toward the ring 2, the support element 1 has a section which has a bevel in an axial direction 7 from the outer circumference 21 to the inner circumference 22, with a bevel alternate angle α' which is an alternate angle to the bevel angle α. The bevel angle α in the figure has a value of 13° C. A value of the bevel angle α preferably lies in a range from 3° C. to 30° C., in particular 10° C. to 20° C. The figure shows that a radial positive engagement is present between short-circuiting ring 2 and support element 1.

The invention offers the advantage that greater suitability for speed is achieved for a rotor 11, in particular a rotor of an asynchronous machine. Under stress of rotational speed, there is no risk that the short-circuiting ring will tilt or that the short-circuiting material will yield.

The support element 1 is preferably pressed onto the short-circuiting ring 2 axially. The support element 1 is supported on the shaft 5. This means that the support element 1 and therefore the short-circuiting ring 2 are mechanically braced by the shaft 5.

FIG. 2 shows a second embodiment of the rotor 11. FIG. 2 shows that the surface of the ring 2 facing away from the rotor core 4 has at least one first region having a first part-bevel in an axial direction 7 from the outer circumference 21 to the inner circumference 22 of the ring 2, with a first part-bevel angle β, and at least one second region having a second part-bevel in an axial direction 7 from the outer circumference 21 to the inner circumference 22 of the ring 2, with a second part-bevel angle γ, wherein the first part-bevel angle β and the second part-bevel angle γ differ.

The figure shows three first regions with the part-bevel angle β and two second regions with the part-bevel angle γ.

The figure also shows the support element 1. The figure shows that the support element 1 has, at the surface facing toward the ring 2, at least one first region having a bevel in an axial direction 7 from the outer circumference 21 to the inner circumference 22, with a part-bevel alternate angle β' which is an alternate angle to the first part-bevel angle β, and that the support element 1 has, at the surface facing toward the ring 2, at least one second region having a bevel in an axial direction 7 from the outer circumference 21 to the inner circumference 22, with a part-bevel alternate angle γ' which is an alternate angle to the second part-bevel angle γ.

The figure here shows three first regions with the part-bevel angle β' and two second regions with the part-bevel angle γ'.

Such an embodiment of the invention allows greater absorption of a radial force component.

FIG. 3 shows a third embodiment of the rotor 11. The embodiment shown is suitable for particularly high circumferential speeds at the outer circumference of the rotor 11. Circumferential speeds of up to 180 m/s are possible.

The figure shows a support element 1 which has an inner support disc 101 and an outer support device 102. In the figure, the inner support disc 101 and the outer support device 102 are connected with a material fit, preferably by means of welding.

A connection between the support disc 101 and the support device 102 is preferably realized at or at least close to the outer circumference. The inner support disc 101 advantageously has recesses, the number of recesses corresponding to the number of slots 3 in the rotor core 4.

The inner support disc 101 is advantageously incorporated when the ring 2 is formed. The inner support disc 101 is preferably cast in during the formation of the ring 2 by means of die casting. The outer support disc 102 is attached after cooling, in particular by means of a bonding force in an axial direction. The welding is preferably performed subsequently. A weld seam is therefore present at the outer circumference of the rotor 11. The welding is optional.

Figure 4:
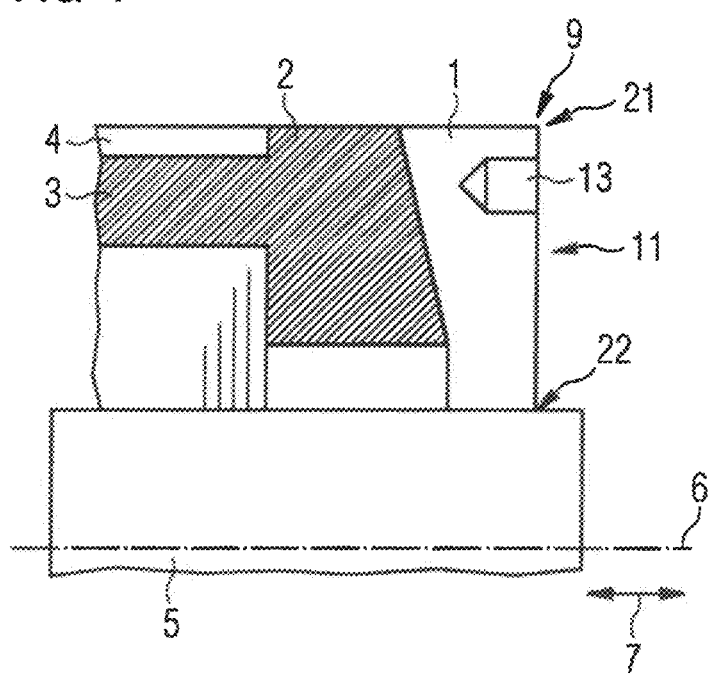
FIG. 4 shows a fourth embodiment of the rotor.

FIG. 4 shows a fourth embodiment of the rotor 11. In addition to the embodiment described above in FIG. 1, the embodiment in FIG. 4 has a recess 13 in the support element 1, said recess being used to correct an imbalance.

The advantage here is that balancing does not take place in the short-circuiting ring as before, but in the support element 1. This means that the support element 1 additionally functions as a balancing disc.

It is also possible to apply a thickening to the support element 1, said thickening being used to correct an imbalance. This is not illustrated in the figure.

Figure 5:
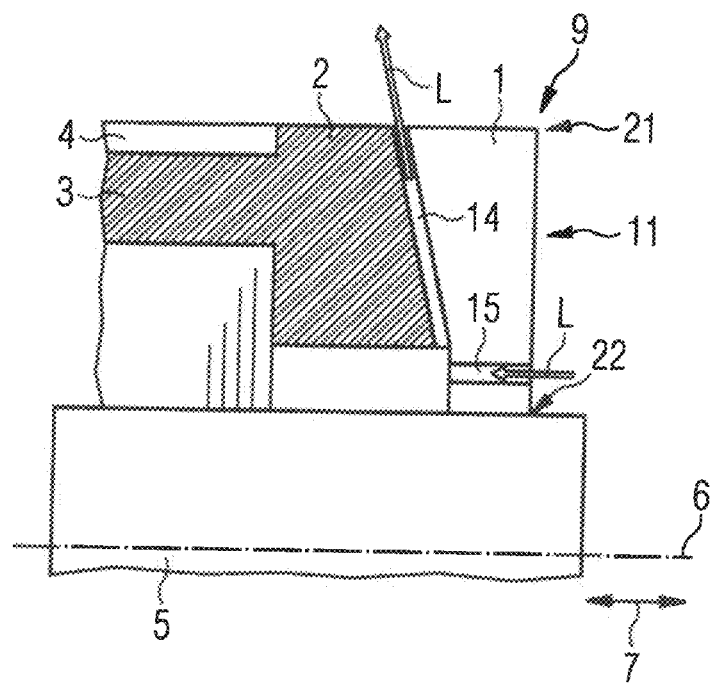
FIG. 5 shows a fifth embodiment of the rotor.

FIG. 5 shows a fifth embodiment of the rotor 11. The figure shows channels 14 and 15, which allow rear ventilation of the rotor 11. This is explained in greater detail in FIG. 6.

Figure 6:
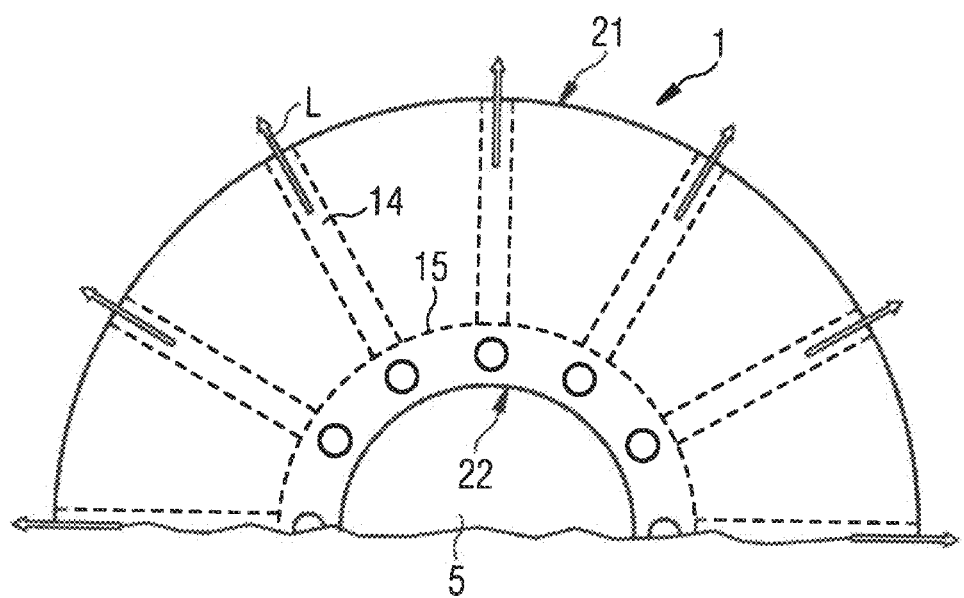
FIG. 6 shows the rotor from FIG. 5, viewed from an end face.

FIG. 6 shows the rotor 11 from FIG. 5, viewed from an end face. Both figures show channels 14 and 15, which are used for rear ventilation of the rotor 11. The channels 14 can be cast in, for example. The channels 15 are present in the support element 1. By virtue of the recesses, air is sucked in during the rotation of the rotor 11. This provides the rear ventilation.

By virtue of these recesses in the support element 1, the air is sucked in during rotation and expelled at the outer circumference of the short-circuiting ring 2.

Figure 7:
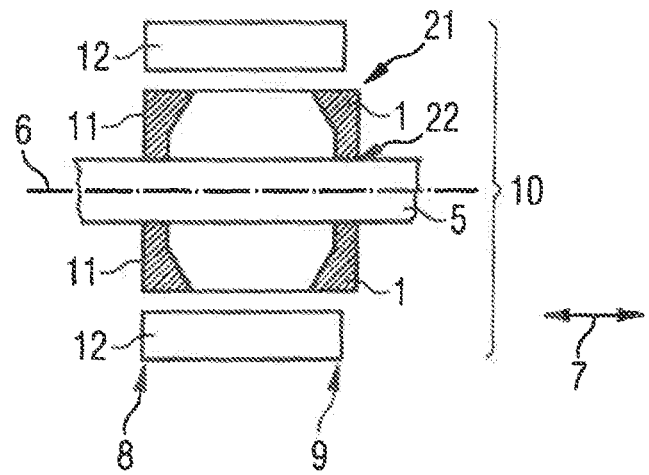
FIG. 7 shows a dynamo-electric rotary machine with the rotor.

FIG. 7 shows a dynamo-electric rotary machine 10 with the rotor 11. The figure shows a stator 12, the shaft 5 and the rotor axis 6. Viewed in an axial direction 7, the rotor 11 has a support element 1 at the front axial end 8. The rotor 11 also has a support element 1 at the rear axial end 9.

Figure 8:
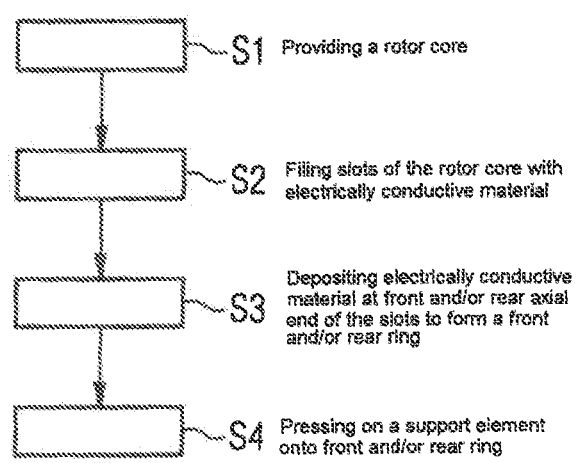
FIG. 8 shows a method for producing the rotor.

FIG. 8 shows a method for producing the rotor 11, a rotor core thereof being arranged concentrically relative to the rotor axis and having slots.

In a method step S1, the rotor core is provided.

In a method step S2, the slots 3 are filled with an electrically conductive material. In this case, the slots 3 can be filled with preprepared bars or by means of die casting. A combination of preprepared bars or other shaped inserts and die casting is also possible.

In a method step S3, electrically conductive material is deposited at the front and/or rear axial end of the slots 3 in order to form a front and/or rear ring 2. This is advantageously achieved by means of die casting.

In a method step S4, the support element 1 is pressed on. The support element 1 is advantageously guided on the shaft during this pressing operation. By virtue of the previously described bevel of the ring 2 and the support element 1, any out-of-round of the short-circuiting ring 2, this being cast in particular, is corrected by the support element 1 and a coaxiality of the whole short-circuiting ring 2 relative to the shaft 5 and hence to the rotor core is improved.

The support element 1 is advantageously shrunk onto a shaft and pressed onto the short-circuiting ring 2 axially under force. As a consequence, the surfaces of the support element 1, these preferably being oriented axially inward, and the outer surfaces of the short-circuiting ring 2 fit tightly together. A bonding force is preferably maintained for approximately 20 to 30 seconds in order to ensure full placement. A bonding force of approximately 30 t is advantageously applied in the case of a short-circuiting ring having a diameter of 130 to 170 mm, in particular 150 mm. The support element is preferably heated up to approximately 120° C. for the purpose of shrinking on.

The invention has the advantage that a casting skin which forms during the die casting of the short-circuiting ring strengthens the short-circuiting ring.

The rotor produced by this method significantly reduces the risk of material displacement due to centrifugal forces, by virtue of the strength of the support element.

The invention claimed is:

1. A rotor of a dynamo-electric rotary machine, said rotor comprising:
a rotor core arranged in concentric relation to a rotor axis and including slots which are filled with electrically conductive material;
a front short-circuiting ring arranged in concentric relation to the rotor axis at a front axial end of the slots and comprising electrically conductive material;
a rear short-circuiting ring arranged in concentric relation to the rotor axis at a rear axial end of the slots and comprising electrically conductive material, wherein at least one member selected from the group consisting of the front short-circuiting ring and the rear short-circuiting ring includes a surface facing away from the rotor core and having at least partially a bevel in an axial direction from an outer circumference to an inner circumference of the member, with the bevel defined by a bevel angle having a value of 3° to 30°; and
a support element at least partially connected to the surface of the member with a positive fit, said support element being pressed onto the member axially and supported on a shaft, said support element having a radial end which terminates at a radial end of the member.

2. The rotor of claim 1, wherein the support element has, at a surface facing toward the member, at least one section which has a bevel in the axial direction from an outer circumference to an inner circumference of the support element, with the bevel of the section defined by a bevel alternate angle which is an alternate angle to the bevel angle.

3. The rotor of claim 1, wherein the support element comprises a material having a tensile strength of 800 N/mm² to 1200 N/mm².

4. The rotor of claim 1, wherein the support element comprises steel.

5. The rotor of claim 3, wherein the support element is connectable to the shaft via an interference fit.

6. The rotor of claim 1, wherein the support element has at least one of recess and a thickening, for correcting an imbalance.

7. A dynamo-electric rotary machine, comprising a rotor as set forth in claim 1.

8. A rotor of a dynamo-electric rotary machine, said rotor comprising:
a rotor core arranged in concentric relation to a rotor axis and including slots which are filled with electrically conductive material;
a front ring arranged in concentric relation to the rotor axis at a front axial end of the slots and comprising electrically conductive material;
a rear ring arranged in concentric relation to the rotor axis at a rear axial end of the slots and comprising electrically conductive material, wherein at least one member selected from the group consisting of the front ring and the rear ring includes a surface facing away from the rotor core and having at least partially a bevel in an axial direction from an outer circumference to an inner circumference of the member with the bevel defined by a bevel angle having a value of 3° to 30°; and
a support element designed to at least partially connect to the member with a positive fit, said support element being pressed onto the member axially and supported on a shaft, said support element having a radial end which terminates at a radial end of the member wherein the surface of the member includes a first region having a first part-bevel in the axial direction from the outer circumference to the inner circumference of the member, with the first part-bevel defined by a first part-bevel angle, and a second region having a second part-bevel in the axial direction from the outer circumference to the inner circumference of the member, with the second part-bevel defined by a second part-bevel angle which differs from the first part-bevel angle.

9. The rotor of claim 8, wherein the support element has a surface facing toward the member and including a first region having a bevel in the axial direction from the outer circumference to the inner circumference of the support element, with the bevel of the first region defined by a part-bevel alternate angle which is an alternate angle to the first part-bevel angle, and a second region having a bevel in the axial direction from the outer circumference to the inner circumference of the support element, with the bevel of the second region defined by a part-bevel alternate angle which is an alternate angle to the second part-bevel angle.

10. A method for producing a rotor said method comprising:
filling with electrically conductive material slots of a rotor core in concentric arrangement to a rotor axis;

depositing electrically conductive material at a front end and a rear axial end of the slots to form a front ring and a rear ring using a shaping device such that at least one member selected from the group consisting of the front ring and the rear ring has a surface which faces away from the rotor core and which is at least partially given a bevel in an axial direction from an outer circumference to an inner circumference of the member with the bevel defined by a bevel angle having a value of 3° to 30°;

pressing a support element axially onto the member with the support element being supported on a shaft and with a radial end of the support element terminating at a radial end of the member; and shaping the surface of the member with a first region having a first part-bevel in the axial direction from the outer circumference to the inner circumference of the member, with the first part-bevel defined by a first part-bevel angle, and a second region having a second part-bevel in the axial direction from the outer circumference to the inner circumference of the member, with the second part-bevel defined by a second part-bevel angle which differs from the first part-bevel angle.

11. The method of claim 10, further comprising shaping a member-facing surface of the support element with a first region having a bevel in the axial direction from the outer circumference to the inner circumference of the support element, with the bevel of the first region defined by a part-bevel alternate angle which is an alternate angle to the first part-bevel angle, and a second region having a bevel in the axial direction from the outer circumference to the inner circumference of the support element, with the bevel of the second region defined by a part-bevel alternate angle which is an alternate angle to the second part-bevel angle.

12. A method for producing a rotor, said method comprising:

filling with electrically conductive material slots of a rotor core in concentric arrangement to a rotor axis;

depositing electrically conductive material at a front end and a rear axial end of the slots to form a front short-circuiting ring and a rear short-circuiting ring using a shaping device such that at least one member selected from the group consisting of the front short-circuiting ring and the rear short-circuiting ring has a surface which faces away from the rotor core and which is at least partially given a bevel in an axial direction from an outer circumference to an inner circumference of the member, with the bevel defined by a bevel angle having a value of 3° to 30°; and pressing a support element axially onto the surface of the member, with the support element being supported on a shaft and with a radial end of the support element terminating at a radial end of the member.

13. The method of claim 12, further comprising shrinking the support element onto the shaft.

14. The method of claim 13, further comprising heating the support element up to a temperature of 100° C. to 140° C., as the support element is shrunk onto the shaft.

15. The method of claim 12, wherein the support element is pressed onto the member in the axial direction.

16. The method of claim 12, wherein the support element is pressed onto the member with a bonding force of 20 to 40 t.

17. The method of claim 12, further comprising shaping the support element at a surface facing toward the member with at least one section which has a bevel in the axial direction from an outer circumference to an inner circumference of the support element, with the bevel of the section defined by a bevel alternate angle which is an alternate angle to the bevel angle.

18. The method of claim 12, further comprising connecting the support element to the shaft via an interference fit.

19. The method of claim 15, further comprising forming the support element with at least one of recess and a thickening for correcting an imbalance.

* * * * *

UNITED STATES PATENT AND TRADEMARK OFFICE
CERTIFICATE OF CORRECTION

| | | |
|---|---|---|
| PATENT NO. | : 12,224,626 B2 | Page 1 of 1 |
| APPLICATION NO. | : 17/912389 | |
| DATED | : February 11, 2025 | |
| INVENTOR(S) | : Mario Büttner et al. | |

It is certified that error appears in the above-identified patent and that said Letters Patent is hereby corrected as shown below:

On the Title Page

On the second page under item (56) FOREIGN PATENT DOCUMENTS:
Replace "JP 84942404 U 7/1974" with the correct --JP S4942404 U 4/1974--.

Signed and Sealed this
Twenty-fifth Day of March, 2025

Coke Morgan Stewart
*Acting Director of the United States Patent and Trademark Office*